United States Patent
Dieselberg et al.

(10) Patent No.: US 9,820,006 B2
(45) Date of Patent: Nov. 14, 2017

(54) DIAGNOSING AND OPTIMIZING NETWORK-WIDE IPTV CONFIGURATIONS

(71) Applicant: Adtran Inc., Huntsville, AL (US)

(72) Inventors: Chad Anthony Dieselberg, Madison, AL (US); Milton Jay Johnson, Owens Cross Roads, AL (US); Marc Kimpe, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 232 days.

(21) Appl. No.: 14/274,278

(22) Filed: May 9, 2014

(65) Prior Publication Data

US 2015/0326939 A1 Nov. 12, 2015

(51) Int. Cl.
| | | |
|---|---|---|
| H04N 7/173 | (2011.01) | |
| H04N 21/61 | (2011.01) | |
| H04N 21/647 | (2011.01) | |
| H04N 21/643 | (2011.01) | |
| H04N 21/6405 | (2011.01) | |
| H04L 12/18 | (2006.01) | |

(52) U.S. Cl.
CPC ......... *H04N 21/61* (2013.01); *H04N 21/6125* (2013.01); *H04N 21/643* (2013.01); *H04N 21/6405* (2013.01); *H04N 21/647* (2013.01); *H04N 21/64322* (2013.01); *H04N 21/64738* (2013.01); *H04L 12/185* (2013.01)

(58) Field of Classification Search
CPC ......... H04N 21/6125; H04N 21/64738; H04N 21/64322
USPC ....................................................... 725/109
See application file for complete search history.

(56) References Cited

U.S. PATENT DOCUMENTS

| | | | | |
|---|---|---|---|---|
| 2005/0193105 A1* | 9/2005 | Basham | ................ | H04L 41/046 709/223 |
| 2009/0141659 A1* | 6/2009 | Martin | ................ | H04L 41/0213 370/256 |
| 2009/0177878 A1* | 7/2009 | Gao | .................... | H04L 67/1097 713/100 |
| 2009/0254952 A1* | 10/2009 | Sridhar | ............... | H04L 41/5012 725/92 |
| 2010/0036939 A1* | 2/2010 | Yang | ................... | H04L 12/2697 709/224 |
| 2010/0128600 A1* | 5/2010 | Srinivasmurthy | ...... | H04L 41/12 370/221 |
| 2012/0023533 A1* | 1/2012 | Wang | ................. | H04N 21/4622 725/109 |
| 2012/0102136 A1* | 4/2012 | Srebrny | ............. | H04L 12/1886 709/213 |
| 2015/0092538 A1* | 4/2015 | Vasseur | ................... | H04L 45/24 370/225 |

* cited by examiner

*Primary Examiner* — Michael B Pierorazio
(74) *Attorney, Agent, or Firm* — Fish & Richardson P.C.

(57) ABSTRACT

Methods, systems, and apparatus for diagnosing and optimizing an Internet Protocol television (IPTV) network are disclosed. In one aspect a method includes receiving a network address of a device; detecting a network topology associated with the device based on the network address of the device; identifying a configuration parameter setting associated with the network topology that is outside of a range of acceptable configuration parameter settings for the network topology; and providing output specifying the configuration parameter setting that is outside of the range of acceptable configuration parameter settings.

16 Claims, 3 Drawing Sheets

DIAGNOSING AND OPTIMIZING NETWORK-WIDE IPTV CONFIGURATIONS

BACKGROUND

This specification relates to communicating Internet Protocol television (IPTV) in a communication environment.

IPTV is the delivery of multimedia services (e.g., television, video, audio, text, graphics, data) using the Internet protocol (IP) suite over a packet-switched network such as a LAN or the Internet. These services may include, for example, Live TV, Video on Demand (VoD) and Interactive TV (iTV). IPTV can offer security, interactivity, reliability, and required quality of service and performance.

SUMMARY

In general, one innovative aspect of the subject matter described in this specification can be embodied in methods that include receiving a network address of a device; detecting a network topology associated with the device based on the network address of the device; identifying a configuration parameter setting associated with the network topology that is outside of a range of acceptable configuration parameter settings for the network topology; and providing output specifying the configuration parameter setting that is outside of the range of acceptable configuration parameter settings.

Another innovative aspect of the subject matter described in this specification can be embodied in a device that includes a memory storing instructions executable by one or more processors; one or more processors configured to interact with the memory and execute the instructions that cause the device to be configured to: receive a network address of a device; detect a network topology associated with the device based on the network address of the device; identify a configuration parameter setting associated with the network topology that is outside of a range of acceptable configuration parameter settings for the network topology; and provide output specifying the configuration parameter setting that is outside of the range of acceptable configuration parameter settings.

Another innovative aspect of the subject matter described in this specification can be embodied in a system that includes an Internet Protocol television (IPTV) network including a plurality of devices; and a device configured to: receive a network address of one of the plurality of devices; detect a network topology associated with the device based on the network address of the device; identify a configuration parameter setting associated with the network topology that is outside of a range of acceptable configuration parameter settings for the network topology; and provide output specifying the configuration parameter setting that is outside of the range of acceptable configuration parameter settings.

These and other embodiments can each optionally include one or more of the following features. Identifying a configuration parameter setting that is outside of a range of acceptable configuration parameter settings can include performing Internet Protocol television (IPTV) diagnostic procedures across a plurality of devices within the detected network topology; and determining that an IPTV configuration parameter setting for one of the devices does not match a range of acceptable IPTV configuration parameter settings corresponding to the network topology. The IPTV configuration parameter setting can include an Internet Group Management Protocol (IGMP) configuration parameter setting. The IPTV configuration parameter setting can include a priority or a queue configuration parameter setting. Methods can include the action of changing the configuration parameter setting to be within the range of acceptable configuration parameter settings for the network topology. Methods can include the action of determining that changing a second configuration parameter setting associated with the network topology to a new setting will improve operation of devices in the network topology; and changing the second configuration parameter setting to the new setting. In some instances, changing a second configuration parameter setting associated with the network topology to a new setting can include turnings off Internet Group Management Protocol (IGMP) processing of one or more devices within the network topology.

Particular embodiments of the subject matter described in this specification can be implemented so as to realize one or more of the following advantages. Diagnosing and optimizing IPTV related settings on a network basis can be implemented as an automated process. The automated process can require as little information from the carrier or customer as possible, and can automatically discover network topologies, detect IPTV configurations of each device in the network and test for IPTV related issues or problems. The automated process can perform a more comprehensive and accurate diagnosis over the entire network and can be more effective and efficient than manual intervened processes. In some instances, the overall automated application can be performed and completed in minutes, whereas manual adjustments to an IPTV network can take many hours and potentially days to complete, especially in a large network.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In an Internet Protocol television (IPTV) network that include multiple devices (also referred to as nodes), it is desirable that each device in the network is properly configured. Misconfigurations may have significant impacts on network performance not only for the misconfigured device but also for other devices in the network. In some instances, network reconfigurations and network additions that happen gradually over time may not be properly reflected in Internet Group Management Protocol (IGMP) configuration or other related IPTV settings (e.g., one or more configurations or settings do not match or conflict with suggested or optimal configurations for the changed network). Existing techniques for diagnosing and optimizing IPTV related settings requires manual intervention to provision individual devices and can be less effective and error-prone on a network-wide scale due to the lack of an accurate overall network topology and detailed configuration parameter settings for each and every devices in the IPTV network. In some cases, manual changes made to an IPTV network are made without knowledge of, or with an incorrect assumption as to, the settings of one or more devices in the network, which can negatively impact the performance of the IPTV network (e.g., resulting in intermittent outages or other service disruptions).

Example techniques for automated network-wide diagnosing and optimizing IPTV related configurations in a telecommunication network are disclosed in this document. In some implementations, the techniques can be implemented, for example, as a push button application. When invoked, the application can query a user (e.g., a network operator, a technician, etc.) for an IP address or a fully qualified domain name (FQDN) of a device of the network under investigation and/or optimization. The application can automatically connect to the network using the input information and discover the network topology. Configuration settings of each node in the network topology can be parsed and checked, for example, against a set of recommended configuration settings. In some implementations, the application can be interactive. For example, the application may present the user an option to execute the IPTV diagnostic routines on the discovered network. When invoked, the IPTV diagnostic routines can be executed across each device (or a subset of devices) in the network to examine and validate configuration settings and operation of the IPTV network.

In some implementations, the IPTV diagnostic routines can detect any IPTV related misconfigurations that require correction (e.g., by way of changes to the configuration settings of one or more devices) prior to optimization of the network. These corrections may be performed manually or may be automated. Once corrected, the IPTV diagnostics routines can be re-executed to ensure that the IPTV settings have in fact been corrected and no new issues are introduced by the changes to the configuration settings.

In some implementations, once proper configuration and operation are established, optimization of IPTV related configurations (e.g., IGMP settings) through the network can be performed. For example, in some instances, IGMP processing can be turned off where it is not needed to improve overall control-plane latency and CPU utilization.

The example techniques described herein can be implemented as methods, computer program products, apparatus, devices, etc., and can be used in connection with Network Management Interfaces, for example, to improve the management capabilities of a telecommunications network and improve testing relating to network equipment and services. The example techniques can permit better control and operation of the system. The example techniques can be applied to IGMP parameter settings, Carrier Ethernet (CE) 2.0 parameter settings, queue parameter settings, voice parameter settings, traffic data parameter settings, or other configuration parameter settings.

Throughout this document the terms downlink, downstream (DS) and downstream communications are used to refer to communications transmitted toward the end user, while the terms uplink, upstream (US) and upstream communications are used to refer to communications transmitted toward the service provider (e.g., a telecommunications service provider's central office).

Figure 1:
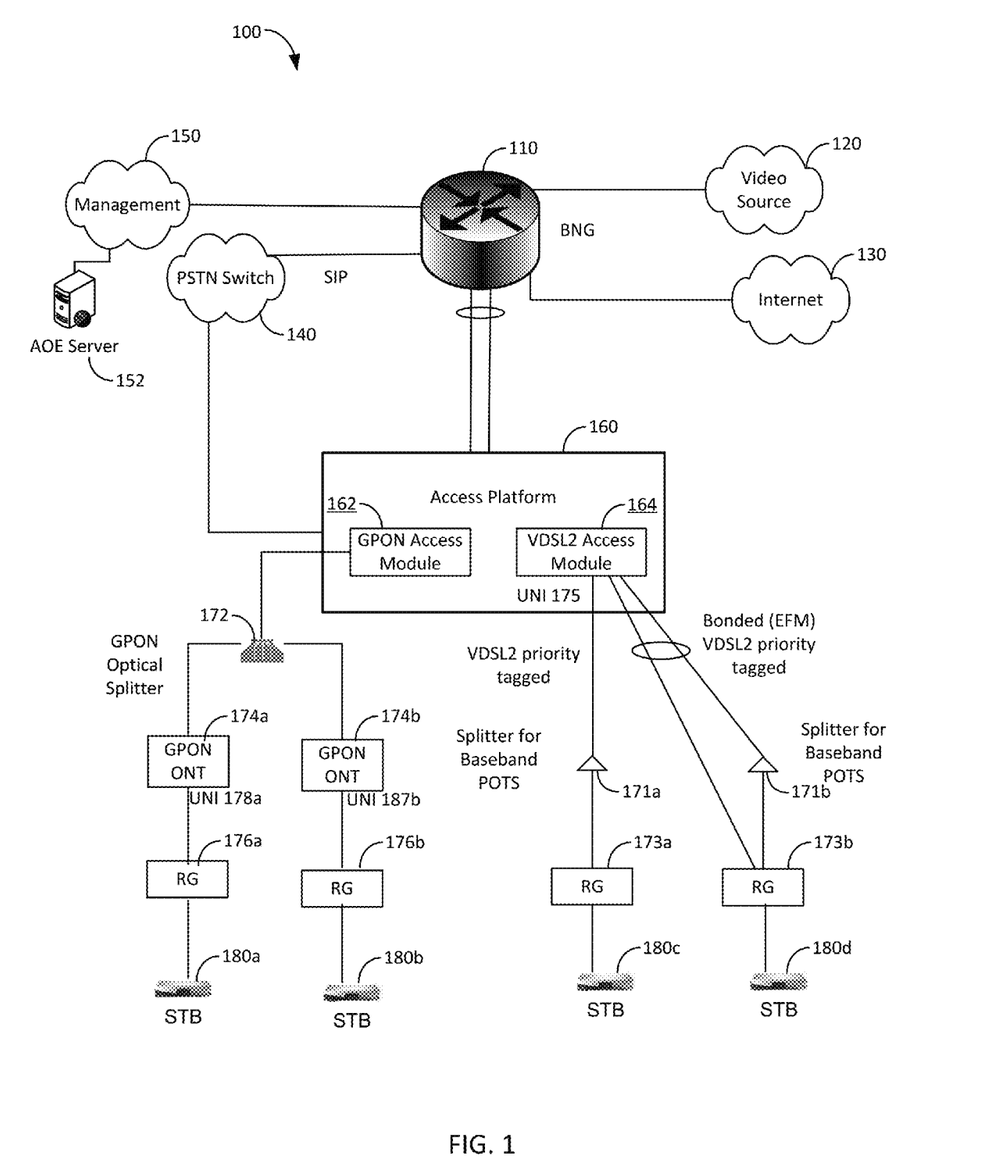
FIG. 1 is a block diagram of an example IPTV network.

The discussion that follows with reference to FIG. 1 introduces components of an example IPTV network that can be used to deliver IPTV services. The description referencing FIG. 2 relates to an example IGMP configuration that can be implemented by the example IPTV network of FIG. 1. The description referencing FIG. 3 provides details regarding an example method for diagnosing and optimizing configurations of an IPTV network.

FIG. 1 is a block diagram of architecture of an example IPTV network 100. The IPTV network 100 includes a broadband network gateway (BNG) 110 that is connected to a video source 120, Internet 130, a public switched telephone network (PSTN) switch 140, and a management system that is further connected to an Advanced Technology Attachment (ATA) over Ethernet (AoE) server 152. In particular, the video source 120 can include one or more of a super head end office (SHO), a video head end office (VHO) or other video sources. The video source 120 can provide national, local, or other television content. In some implementations, the BNG 110 can connect to additional or different networks, servers and systems. Traffic data from the head end, middleware servers, VoD servers, DNS servers, etc. to customers can all be routed across the BNG 110 to one or more network access devices for providing network services using various access technologies. In some implementations, one or more of the networks, servers and systems may connect to the network access devices directly without the BNG 110.

BNG 110 is coupled to a multi-service access and aggregation platform (MSAP) 160 that bridges the gap between the existing and the next generation networks and provides multiple network services using xDSL (e.g., ADSL2+, VDSL2, etc.), fiber to the premises network (FTTP), or other technologies. In some implementations, in addition to or as an alternative to an integrated network access device such as the access platform 160, the BNG 110 can connect to multiple independent or separated network access devices that each support respective access technologies.

The access platform 160 can support both legacy and emerging service interfaces over copper, fiber, or other types of communications links. In some implementations, the access platform 160 can include multiple access modules (AMs) for different access technologies. In the example shown in FIG. 1, the access platform 160 includes Gigabit Passive Optical Network (GPON) AM 162 and VDSL2 AM 164. The access platform 160 can include additional or different AMs. The access platform 160 can be implemented in a Central Office, Remote Terminal and Remote Node or any other appropriate locations in an IPTV network.

The GPON AM 162 can serve as an optical line terminal (OLT) for providing network services to users using fiber optic cables. The GPON AM 162 is coupled to GPON Optical Network Terminals (ONTs) 174a and 174b through a GPON optical splitter 172. In some implementations, a residential gateway (RG) can be used in the residential home. The RG can function as a modem that serves one or more set top boxes (STBs) of a customer or subscriber. In the example shown in FIG. 1, the GPON ONTs 174a and 174b are coupled to RGs 176a and 176b that are further coupled to the STBs 180a and 180b, respectively.

The VDSL2 AM 164 can provide network services to users using twisted pair cables based on VDSL2 technologies. In some implementations, the VDSL2 AM 164 can also support ADSL, ADSL2, ADSL2+, or other xDSL technologies. The VDSL2 AM 164 can connect to one or more RGs (e.g., RGs 173a and 173b) directly or via a splitter for baseband Plain Old Telephone Service (POTS) (e.g., splitters 171a and 171b). The RGs 173a and 173b are coupled to STBs 180c and 180d, respectively.

In the example IPTV network 100, TV streams encoded in a series of IP packets can be transmitted from the video source 120 to the users' STBs 180a-d via a broadband access network that includes multiple gateways, routers, and switches (e.g., the BNG 110, the access platform 160, the RGs, etc.). For instance, depending on the infrastructure and/or service providers, the IP video traffic routed over the BNG 110 can pass through the GPON AM 162 of the access platform 160 using fiber optical technologies, or go through the VDSL2 AM 164 based on the xDSL technologies. The GPON AM 162, VDSL2 AM 164 or other AMs of the access platform 160 provide, for example, Internet Group Management Protocol (IGMP) signaling and multicast replication functions for the IPTV services.

In some implementations, an IPTV network can include additional or different components and features and can be configured in a different manner than the example IPTV network 100 in FIG. 1.

As illustrated by FIG. 1, the network 100 includes a number of different devices that can each be separately configured when added to the network 100. If the configuration settings for one of the devices conflicts with those of another device or fail to match a set of recommended settings, performance of the network can be degraded (e.g., as evidenced by intermittent outages or degraded data transfer rates. To facilitate proper operation of the network 100, the BNG 110, the MSAP 160, the GPON ONTs 174*a-b*, the RGs 176*a-b* and 1873*a-b*, the STBs 180*a-d* or another device connected to the network can include a configuration application that discovers the topology of the network and configuration settings for each device in the network. In turn, the application can evaluate the discovered configuration settings based, for example, on a set of recommended configuration settings, and adjust the configuration settings of one or more of the devices so that the configuration settings of the network comply with at least a portion of the recommended configuration settings.

Figure 2:
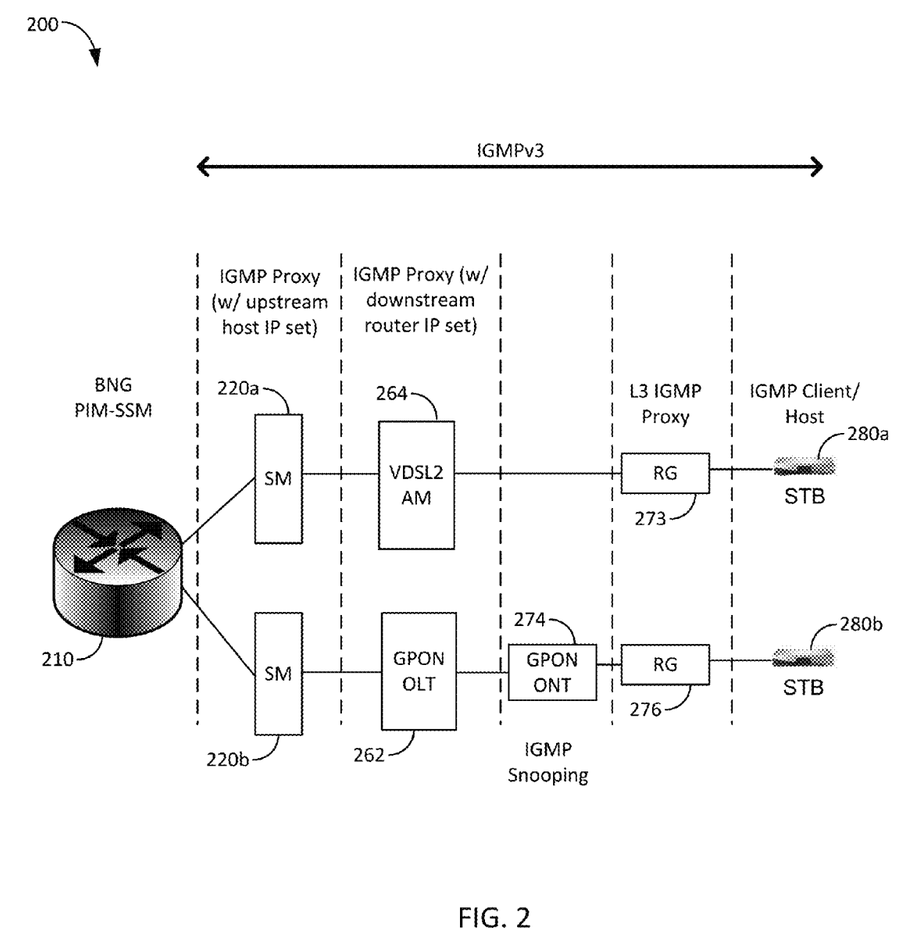
FIG. 2 is a block diagram showing example Internet Group Management Protocol (IGMP) configurations of an IPTV network.
Figure 3:
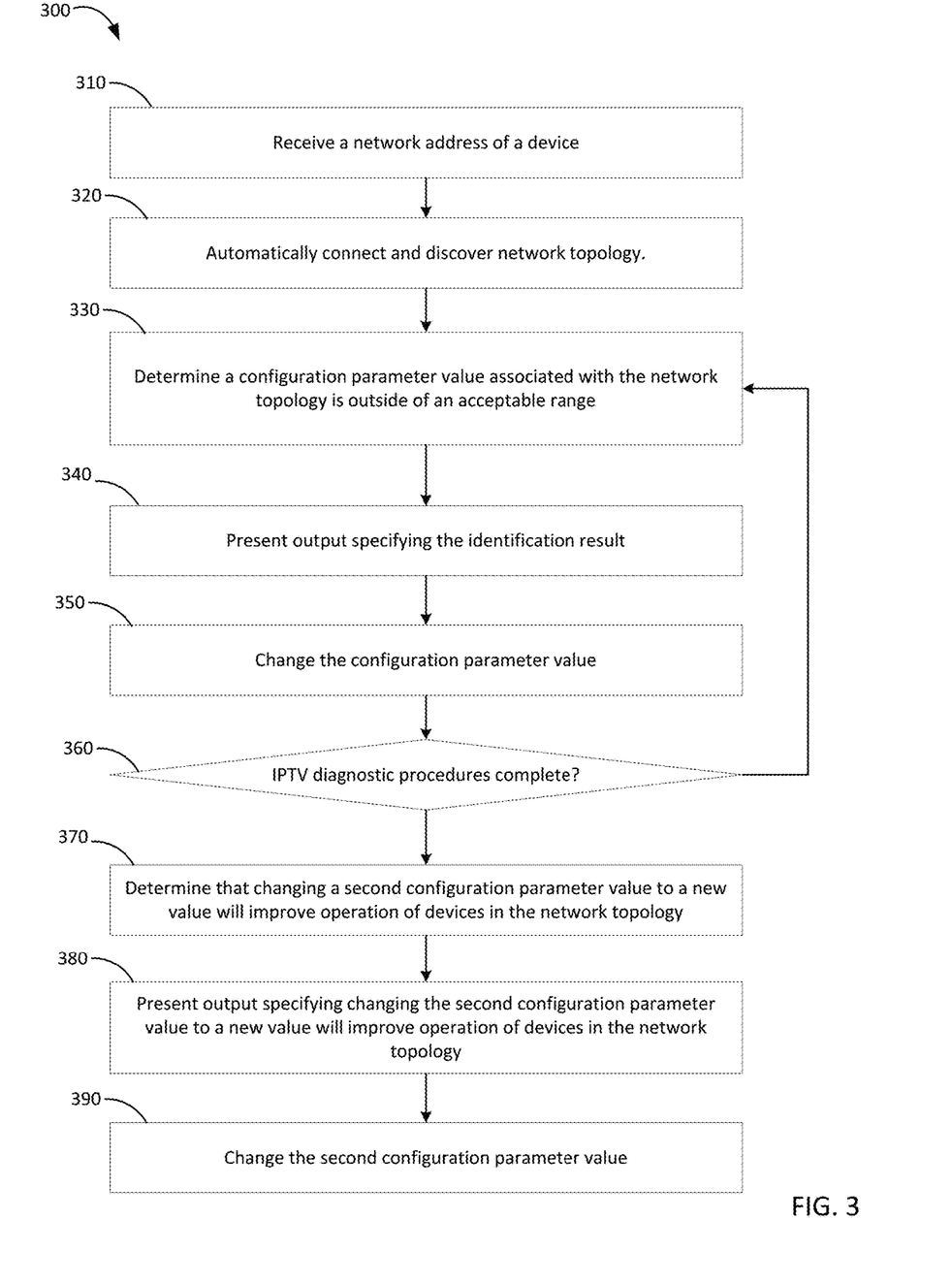
FIG. 3 is a flow chart of an example process for diagnosing and optimizing network-wide IPTV settings.

FIG. 2 discusses some of the recommended configuration settings for an IPTV network, and FIG. 3 discusses an example process by which an application can reconfigure network configuration settings for an IPTV network (or another network).

FIG. 2 is a block diagram showing example IGMP configurations for an IPTV network 200. IGMP is a protocol used in IP networks supporting multicast communications. IGMP messages can be separate from packets used for data transfer. In general, IGMP processing needs to be enabled where there is a rate mismatch between ingress interface speed and egress interface speed. Generally, the ingress rate speed should be sufficient to handle the amount of inbound multicast traffic.

IGMP has three versions, IGMPv1, IGMPv2 and IGMPv3. Relative to IGMPv1, IGMPv2 adds, for example, the ability for a host to signal a desire to leave a multicast group. IGMPv3 adds to the capabilities of IGMPv2, for example, by supporting source-specific multicast. In some instances, if IGMPv2 or IGMPv3 can be provisioned, it is recommended to use IGMPv3 as it is fully backwards compatible with IGMPv2. IGMPv2 may also be employed if desired as STBs will generally fall back to IGMPv2 automatically. FIG. 2 shows an example IGMPv3 configuration.

The IPTV network 200 can be the same IPTV network 100 of FIG. 1, or it can represent another telecommunication network. The IPTV network 200 includes a BNG 210 that is coupled to a VDSL2 AM 264 and a GPON OLT 262, via switch module (SMs) 220*a* and 220*b*, respectively. The SMs modules can be part of an access platform (e.g., the MSAP 160 in FIG. 1). An SM can be coupled to multiple AMs for aggregation. The VDSL2 AM 264 is coupled to an RG 273 that serves an IGMP client/host, STB 280*a*, while the GPON OLT 262 is coupled, via a GPON ONT 274, to an RG 276 that serves an IGMP client/host, STB 280*b*.

In a telecommunication network, an Ethernet virtual circuit (EVC) is a conceptual channel or pipe for sending a service of the service provider network (e.g., the video source 120 of FIG. 1). The EVC can be terminated at ends of network, e.g., an EVC map. The EVC map can define entrance and exit criteria for the service. For example, the EVC map can specify what the physical endpoint is (e.g., a customer endpoint or a network endpoint, etc.) and what the properties of the endpoint include (e.g., types of packets, the rate, priority, etc. that can be passed through).

For IPTV services, on the EVC, the IGMP snooping or proxy should be enabled for branching or multicasting the video streams. In some implementations, the IGMP snooping or proxy can only be enabled on one EVC. In an IPTV network, some nodes may have IGMP snooping enabled, some nodes may have IGMP proxy enabled, while some nodes (e.g., an aggregation node) may have neither enabled. The different configurations can be determined, for example, based on the network architecture or other criteria.

In the illustrated example of FIG. 2, each of the AMs 264 and 262 can be provisioned as an IGMP proxy; the RGs 273 and 276 can be provisioned as IGMP proxies; and the GPON ONT 274 can be provisioned for IGMP snooping. By default, downstream proxied queries utilize a source IP address of 0.0.0.0. In some implementations, the recommended configuration settings provide that the source IP address be set to match the IP address of the BNG 210. The recommended configuration settings can include configuration settings that are required to configure a functioning network and/or configuration settings that are suggested to optimize performance of the network. In some instances, the recommended configuration settings provide that the SMs 220*a* and 220*b* connected to the upstream BNG 210 should also be provisioned as an IGMP proxy. By default, upstream summarized reports can be sent with a source IP address of 0.0.0.0. In some implementations, the recommended configuration provides that the source IP address should be set to the management IP address of the node. This can allow easier identification of IGMP traffic at the BNG.

In some other IGMP configurations, the recommended configuration settings provide that immediate-leave can be enabled on multicast enabled EVC-maps facing customers. This can allow for the most efficient use of the bandwidth on a user network interface (UNI). For IGMP priority marking, the recommended configuration settings provide that IGMP packets generated by the proxy agent on the AM and SM should be set with the appropriate p-bit. On EVC maps, priority of incoming packets can be set to be no less than the priority of the incoming video. Otherwise, control messages will be at a lower priority and may be lost due to congestion and further lead to data packets loss.

For traffic management configurations, various queue, scheduling, and priority configurations can be provisioned. For example, in some implementations, 4 queue or 8 queue setups can be provisioned. The recommended configuration settings provide that the queuing model (e.g., the priority level of the queue, separated queues or a single queue) used by the rest of the equipment in the network should be matched. In some instances, this may be dictated by the number of queues supported on the BNG or RG. Conversely, it may be that 4 queues are insufficient given the number of traffic types in the network. 4 queues may be a tight fit for a converged triple-play network; and in some instances, an 8 queue setup should be configured if feasible.

In some implementations, strict priority can be the recommended (or default) method for scheduling traffic from queues. Tail drop can be the recommended (or default) method for handling queue congestion. In some implementations, shapers may be employed for Internet traffic subscribed by a video customer fed by xDSL. Shapers also may be employed for customers on ActiveE GPON or other feeds with or without video service.

In general, a video customer or client will be provisioned for an xDSL line rate that is substantially higher than the subscribed Internet rate. Since Internet traffic falls into a lower priority queue than video traffic, Internet traffic will not starve out video traffic. However, it is possible that Internet traffic could exceed the subscribed (paid-for) rate. Traffic shapers can address this issue by limiting Internet traffic to the subscribed shaped rate. Traffic shapers can use traffic management (e.g., rate limiting) technique to delay some or all data packets such that the packets comply with a desired traffic profile. Shapers can be applied on an network access device (e.g., the access platform 160 in FIG. 1) or they may be employed at the BNG (e.g., the BNG 110 in FIG. 1 or the BNG 210 in FIG. 2).

In some implementations, for priority marking, Ethernet p-bits can be marked in the downstream at the BNG. This can be done with a Differentiated services Code Point (DSCP) to p-bit mapping on egress toward the network access device. For example, when virtual local area network (VLAN) is supported, QoS priority can be preserved as p-bit (7 bit) within a VLAN ID.

In some implementations, priority marking can also be done in the upstream by the RG, for example, when there is a tagged or priority-tagged user network interface (UNI). In this way the network access device can inherit the p-bits in both the downstream and upstream directions. For example, in the example IPTV network 100 of FIG. 1, the UNI 175 between the Metro Ethernet Network (MEN) and the subscriber network of the STB 180c can be VDSL2 priority tagged. The VDSL2 AM 164 can inherit the p-bits in both the downstream and upstream directions for the STB 180c.

If the UNI is untagged, then p-bits may need to be marked in the upstream direction. In some implementations, the parameters need to be configured such that all traffic is properly marked and (Quality of Service) QoS to queue mappings are correct and consistent. Table 1 shows an example traffic mapping for various traffic types.

Additional or different recommended configurations or settings can be provided. For example, Table 2 and Table 3 below illustrate example recommended settings for VDSL2 and ADSL2+ when they are utilized for transmitting IP video, respectively.

TABLE 2

IPTV VDSL2 Recommended Settings
IPTV VDSL2 Recommended Settings

| | |
|---|---|
| Line Service State | In Service |
| Service Mode | VDSL2 |
| Line Type | Interleaved |
| VDSL2 Band Profile | 8A/17A |
| Cabinet Mode | FTTEX |
| Hamband Mask | disabled |
| Rate Mode | adapt at startup |
| VDSL2 PSD Mask | VDSL2_A_M1_EU32 |
| DS Target SNR Margin | 9 dB |
| DS Max SNR Margin | 16 dB |
| DS Min SNR Margin | 2 dB |
| DS Interleave Max Tx Rate | 50000 kbps/100000 kbps (or Subscribed Rate) |
| DS Interleave Min Tx Rate | 32 kbps |
| DS Interleave Max Delay | 8 ms |
| DS Interleave Min INP | 4 hsym |
| DSPBO | Disabled |
| US Target SNR Margin | 9 dB |
| US Max SNR Margin | 16 dB |
| US Min SNR Margin | 2 dB |
| US Interleave Max Tx Rate | 18000 kbps/40000 kbps (or Subscribed Rate) |
| US Interleave Min Tx Rate | 32 kbps |
| US Interleave Max Delay | 4 ms |
| US Interleave Min INP | 2 hsym |
| US PBO | Enabled Custom* |

TABLE 3

IPTV ADSL2+ Recommended Settings
IPTV ADSL2+ Recommended Settings

| | |
|---|---|
| Line Service State | In Service |
| Service Mode | ADSL2+ |
| Line Type | Interleaved |
| Cabinet Mode | disabled |
| Hamband Mask | disabled |
| Rate Mode | adapt at startup |
| Power Threshold | disabled |
| DS Target SNR Margin | 9 dB |

TABLE 1

Example Traffic Mapping

| Service | DSCP Name | P-Bit | 8 Queues | Description |
|---|---|---|---|---|
| Control | CS6 (48) | 7 (111) | 7 | Network Control. |
| VoIP | EF/CS5/ AF31 | 6 (110) | 6 | VoIP/PWE Bearer RTP Streams/SIP |
| Multicast Video (Broadcast) | AF41 (36) | 5 (101) | 5 | Broadcast Multicast Video and IGMP |
| VoD Streaming | AF32 (28) | 4 (011) | 4 | VoD Streaming and associated signaling |
| Middleware Control, Client Gateway, NTP | AF21 (18) | 3 (011) | 3 | Middleware signaling and control |
| IPTV Application/ Business VPN | AF23 (20) | 2 (010) | 2 | Future |
| D-Server/ICC/Re- transmission | AF11 (10) | 1 (001) | 1 | Instant Channel Change and R-UDP Retransmission |
| Standard Internet | BE (0) | 0 (000) | 0 | Standard Residential Internet Access |

TABLE 3-continued

IPTV ADSL2+ Recommended Settings

| IPTV ADSL2+ Recommended Settings | |
|---|---|
| DS Max SNR Margin | 16 dB |
| DS Min SNR Margin | 2 dB |
| DS Interleave Max Tx Rate | 19008 kbps (or Subscribed Rate) |
| DS Interleave Min Tx Rate | 32 kbps |
| DS Interleave Max Delay | 8 ms |
| DS Min INP | 2 frames |
| US Target SNR Margin | 9 dB |
| US Max SNR Margin | 16 dB |
| US Min SNR Margin | 2 dB |
| US Interleave Max Tx Rate | 896 kbps (or Subscribed Rate) |
| US Interleave Min Tx Rate | 32 kbps |
| US Interleave Max Delay | 4 ms |
| US Min INP | 1 frame |

FIG. 3 is a flow chart of an example process 300 for diagnosing and optimizing network-wide IPTV configurations. The process 300 can be implemented, for example, as computer instructions stored on computer-readable media and executable by data processing apparatus, such as one or more processors of a device within a telecommunication network or in connection with Network Management Interfaces of a telecommunication network (e.g., the IPTV network discussed above with respect to FIGS. 1 and 2). In some implementations, the example process 300 can be implemented as a stand-alone application, script, software routine or module, or the example process can be integrated into other software or hardware products and/or deployment scenarios.

In some implementations, the example process 300 can be implemented using Scala—a functional, object-oriented programming language. This implementation can, for example, make use of the inherently recursive and asynchronous threading features of the Scala language. In some instances, parallel computing can be implemented, for example, by executing operations for each node by its own separate thread.

The example process 300, individual operations of the process 300, or groups of operations may be iterated or performed simultaneously (e.g., using multiple threads). In some cases, the example process 300 may include the same, additional, fewer, or different operations performed in the same or a different order.

The example process 300 can be performed, for example, during an initialization, reconfiguration, a test, a troubleshooting process, or any other stages of an IPTV network. For example, the example process 300 can be used in the context of tech support before or after a tech support intervention to know the state of the system. The example process 300 can be performed regularly (e.g., at specified intervals) or from time to time (e.g., upon a request of a user).

A network address of a device is received (310). In some implementations, the network address can include an IP address, a fully qualified domain name (FQDN) or any other network identifier. The device can be, for example, the device can be an STB, an RG, an ONU, an network access device, or any device that is connected to the IPTV network.

A network topology associated with the device can be automatically detected based on the network address of the device (320). In some implementations, the device can be considered as a root node, and the network to which the device is connected can be discovered based on the network address of the root node. For example, given the network address of one device in the example IPTV network 100 of FIG. 1, all devices associated with the device can be found, for example, by recursively discovering the network topology downstream and upstream from the given device, and thus the topology of the entire IPTV network 100 can be discovered and identified.

In some implementations, factory methods can be used to automatically detect the network topology and recursively construct the network. For example, the factory methods can be used for determining what data structure needs to be instantiated in memory and building a data structure that represents this network in memory. In some implementations, the network topology can be stored in a recursive data structure in memory or other computer-readable media. In some instances, each device (or node) in the network can be constructed in parallel by one thread per node.

With the discovered network topology, each device in the network topology can be traversed to identify their respective configuration parameter settings, for example, based on the Simple Network Management Protocol (SNMP) management information bases (MIBs) or other information. As a result, a global picture of the entire network and an aggregation of the configuration parameter settings of every device in the network can be obtained. In some implementations, the identified network topology can be presented, for example, via a GUI, to provide visualization of the network structure and/or configuration parameter settings of each device.

In some instances, a misconfiguration of a configuration parameter can be identified (330). The misconfiguration can include, for example, a configuration parameter setting associated with the network topology that is outside of a range of acceptable configuration parameter settings for the network topology. For instance, in the example of FIG. 2, if IGMP proxies have not been provisioned on the RGs 273 and 276, or the source IP address configured at the SMs 220a and 220b does not match the IP address of the BNG 210 as specified by the recommended configuration settings, misconfiguration can be identified.

In some implementations, identifying a misconfiguration can include performing one or more IPTV diagnostic procedures or routines. Table 4 lists example operations that can be performed during the IPTV diagnostic procedure. Additional or different operations can be included in the IPTV diagnostic procedures.

TABLE 4

Example IPTV Diagnostic Procedures

1. Detect the IGMP EVC configuration
2. Verify that there is a single IGMP EVC configured
3. Verify that the IGMP EVC is enabled
4. Verify that IGMP EVC is running
5. Verify that there is a single men port (i.e., upstream network facing port) associated with the IGMP EVC
6. Verify that the men port is the default-Ethernet port
7. Verify that the uplink (default-Ethernet interface) is enabled
8. Verify that the uplink is running
9. Check the uplink for errors
10. Check the uplink for discards
11. Collect all EVC-maps attached to the IGMP EVC
12. Report which EVC-maps are not enabled
13. Report EVC-maps enabled but not running
14. Report running EVC-maps w/o IGMP processing enabled
15. Report EVC-maps w/IGMP processing, but w/o immediate-leave enabled
16. Report running and properly configured EVC-maps (of the total)
17. Verify that all slots with properly configured and running EVC-maps are configured for IGMP TABLE 4-continued Example IPTV Diagnostic Procedures 18. Check that the IGMP provisioned slots are set to proxy
19. Check for authenticated mac addresses on the properly configured running EVC-maps
20. Report those w/o authenticated macs
21. Check for duplicate macs and report
22. Check for duplicate c-tags and report
23. Collect the UNI's associated with the properly configured and running EVC-maps
24. Verify that UNI's are enabled and report those that are not
25. Report UNI's enabled but not running
26. Report running UNI's with errors
27. Report running UNI's with discards
28. Collect IGMP cache for joined multicast groups including # of joined UNI's per group
29. Verify there are no overloaded multicast macs
30. Setup 8 dynamic counters on the ingress of the uplink one per p-bit for the IGMP EVC.
31. Sort and report p-bit, queue, and rate and determine multicast ingress p-bit and queue.
32. Verify IGMP priority and queue is at the same or higher queue as ingress multicast.
33. Perform other diagnostic operations The IPTV diagnostic procedures can determine if an IPTV configuration parameter setting for one of the devices matches a range of acceptable IPTV configuration parameter settings corresponding to the network topology. The IPTV configuration parameter settings can include one or more of an IGMP configuration parameter setting, an EVC-map configuration parameter setting, a VLAN configuration parameter setting, a traffic management configuration parameter setting, an uplink configuration parameter setting, an UNI configuration parameter setting, or other parameters.

For example, one or more IGMP configuration parameter settings indicate whether the IGMP EVC is enabled, the number of configured IGMP EVCs, which EVCs are IGMP provisioned, whether the IGMP EVC is running, IGMP provisioned proxy configuration, etc. One or more EVC-map configuration parameter settings can indicate which EVC-maps are not enabled, which EVC-maps are enabled but not running, etc. One or more VLAN configuration parameter settings can indicate a VLAN paradigm, whether the VLAN is single tagged, double tagged, etc. One or more traffic management configuration parameter settings can indicate a priority p-bit value, a queue configuration parameter setting, whether there is an EVC priority p-bit to queue mismatch, etc.

The range of acceptable IPTV configuration parameter settings can include one or more settings (e.g., values) that are specified, recommended, or otherwise determined by a service provider, a device supplier, or an operator. For instance, the range of acceptable IPTV configuration parameter settings can depend on, for example, the requirement (e.g., the QoS requirement) of the video provider (e.g., the video source 120 of FIG. 1), the requirement of the device/equipment, and other rules (e.g., subscriber-specific rules, carrier-specific rules, etc.). For instance, the range of acceptable IPTV configuration parameter settings can be determined such that it complies with both the requirement of the video provider and the requirement of the devices in the network.

In some instances, the range of acceptable IPTV configuration parameter settings can include one or more example recommended IGMP configuration parameter settings described above with respect to FIG. 2; example traffic management configurations described above with respect to Table 1, example configuration parameter settings for VDSL2 and ADSL2+ described above with respect to Tables 2-3, or any additional or different IPTV configuration parameter settings.

In some implementations, the range of acceptable IPTV configuration parameter settings of a configuration parameter can be determined probabilistically, for example, based on other configuration parameter settings. For instance, if there are two conflicting configuration parameter settings identified, the acceptable IPTV configuration parameter setting can be determined to be the one that complies with the majority of the other configuration parameter settings. As an example, if two IGMP EVCs A and B are enabled and 90% of the EVC maps are to the IGMP EVC A, then IGMP EVC A can be the acceptable IPTV configuration parameter setting and can thus be recommended to remain enabled, whereas IGMP EVC B can be identified as a non-acceptable IPTV configuration parameter setting and can be recommended to be disabled.

In some implementations, the example IPTV diagnostic procedures can start with diagnosing a major or critical configuration parameter (e.g., the configuration parameter that directly related to a detected problem or issue of the IPTV network) and then with a less critical configuration parameter. For example, the IPTV diagnostic procedures can start with the system-level configuration parameters, then device- or node-level configuration parameters, then slot-level configuration parameters, and finally the subscriber-level configuration parameters. In some other implementations, the example IPTV diagnostic procedures can start with a randomly selected configuration parameter or may be performed in another manner.

In some implementations, the example process 300 can be implemented in an interactive manner to present output and options to the user and receive the user's input before making any changes to the configuration parameter settings of the network.

For instance, in response to identifying that a configuration parameter setting associated with the network topology that is outside of a range of acceptable configuration parameter settings for the network topology, an output specifying the identification result can be presented (340). The identification result can include part or all information obtained based on the diagnostic procedures. For example, the identification result can include one or more of the identified configuration parameter setting, the range of acceptable configuration parameter settings, a suggested change, a recommended solution, a prompt for user's input, or any other appropriate information. In some instances, the output can serve as a report to inform the user the misconfiguration of the network and may solicit the user's input, for example, when there is no automatically determined solution to the misconfiguration. The output can be presented, for example, via a user interface of a computer system to the user.

In some implementations, the identified configuration parameter setting can be changed, for example, such that it is within the range of acceptable configuration parameter settings for the network topology (350). The configuration parameter setting can be changed, automatically or manually per the user's input. The configuration parameter setting can be changed into another setting such as, a recommended or default setting (e.g., the example recommended setting described above with respect to FIG. 2 and Tables 1-4), a user-specified setting, or any other appropriate setting.

In some implementations, the example operations described above with respect to 330, 340, and 350 can be repeated until the IPTV diagnostic procedures are completed (360). The IPTV diagnostic procedures are completed, for example, when the some or all of the example 33 diagnostic operations listed in Table 4 have been performed, the diagnostic operations have been performed on some or all devices in the network topology, no more configuration parameter settings are found to be outside a range of acceptable configuration parameter settings for the network topology, or no new configuration issue is found. The conditions for determining that the diagnostic procedures can be specified, for example, on a per-network or per-administrator basis. In some instances, once a configuration parameter setting of a device is changed, the example IPTV diagnostic procedures can be executed again to reconcile the changed setting with other configuration parameter settings of this device and other devices in the network topology.

In some implementations, upon the completion of the IPTV diagnostic procedures, optimization of the IPTV configurations of the network can be performed. Optimization of the IPTV configurations can include any change, reconfiguration, or manipulation that can lead to an improvement of operation of the devices in the network topology (e.g., relative to a current operation of the devices). The improvement can include, for example, lower latency, better compatibility, less congestion, or other performance enhancements.

In general, the second configuration parameter setting can be the same as or different from the configuration parameter setting that are identified or changed at 330 and 350. In some implementations, despite a configuration parameter setting of a device within the network topology is within an acceptable range of configuration parameter settings, the setting can be changed to a new setting that can lead to an improvement of the performance of the network topology. The new setting can be, for example, a recommended or default setting (e.g., the example recommended setting described above with respect to FIG. 2 and Tables 1-4), a user-specified setting, or another appropriate setting.

For instance, it can be determined that changing a second configuration parameter setting associated with the network topology to a new setting will improve operation of devices in the network topology (370). The second configuration parameter setting can include IGMP configuration parameters (e.g., which device the IGMP is enabled, which type of processing needs to be enabled, etc.), traffic management parameters (e.g., priority and queue parameters) or other configuration parameters.

For example, it can be identified that one or more devices in the network topology do not need IGMP processing (e.g., IGMP proxy or snooping) enabled. In some instances, it can be identified that a device configured with IGMP proxy can be switched to IGMP snooping, and vice versa. In these cases, changing a second configuration parameter setting associated with the network topology to a new setting can include turning off the IGMP processing, changing the type of IGMP processing, etc. to reduce IGMP latency channels and improve overall control-plane latency and CPU utilization.

As another example, based on the priority of an ingress traffic flow of an EVC, the p-bit of the control plane can be set to be at least 1 level above the priority of the data traffic to ensure the correct priority configuration. In some instances, it can be determined that the priority of the queue can be changed to comply with the EVC priority p-bit to resolve any p-bit to queue mapping mismatch. In some implementations, the queue parameters can be changed to ensure that the priority levels and the types of queues (e.g., separated queues or a single queue) are consistent over multiple devices in the path.

In some implementations, in response to identifying that changing the second configuration parameter setting associated with the network topology to the new setting will improve operation of devices in the network topology, an output specifying an optimization option can be presented (380) to the user. The optimization option can indicate that changing the second configuration parameter setting to the new setting will improve operation of devices in the network topology. The output may solicit the user's input as to whether to apply the optimization to change the second configuration parameter setting to the new setting. In some implementations, the output can also specify the expected improvement associated with this optimization option, or any other appropriate information. In some implementations, the output may allow the user to overwrite the new setting into another setting.

In some implementations, the second configuration parameter setting can be changed (390). The second configuration parameter setting can be changed, for example, automatically or manually per the user's confirmation or other input, into the new setting or a user-specified setting.

In some instances, more than one configuration parameter setting can be identified that they can be changed to new settings to improve the operations of the network topology. The example optimization operations 370, 380, and 390 can be performed for multiple configuration parameter settings. In some implementations, the optimization operations can be performed for some or all devices in the network topology, or can be repeated until no more configuration parameter setting needs to be changed to improve the performance of the network topology.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The operations described in this specification can be implemented as operations performed by a data processing device on data stored on one or more computer-readable storage devices or received from other sources.

The term "data processing device" encompasses all kinds of apparatus, devices, and machines for processing data, including by way of example a programmable processor, a computer, a system on a chip, or multiple ones, or combinations, of the foregoing, as well as telecommunications equipment that may include one or more data processing devices. The data processing device can include special purpose logic circuitry, e.g., an FPGA (field programmable gate array) or an ASIC (application specific integrated circuit). The data processing device can also include, in addition to hardware, code that creates an execution environment a computer program, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
   receiving, by one or more data processing devices, a network address of one of a plurality of devices in a network;
   detecting, by the one or more data processing devices, a network topology associated with the one of the plurality of devices based on the network address of the one of the plurality of devices;
   after detecting the network topology, graph traversing the network topology to obtain configuration parameter settings of various devices in the network topology;
   identifying, by the one or more data processing devices and based on the traversing, a first configuration parameter setting of a first device in the network topology that is outside of a range of acceptable configuration parameter settings for the network topology, including identifying the first configuration parameter setting of the first device in the network topology that is inconsistent with a corresponding configuration parameter of a second device in a data transmission path of the network topology that includes the first device and the second device;
   providing output specifying the first configuration parameter setting that is outside of the range of acceptable configuration parameter settings for the network topology;
   changing the first configuration parameter setting to be within the range of acceptable configuration parameter settings for the network topology;
   after changing the first configuration parameter setting, determining that changing a second configuration parameter setting of the first device or another device in the network topology to a different setting will improve operation of a third device in the network topology, wherein the second configuration parameter setting is within the range of acceptable configuration parameter settings for the network topology prior to changing the second configuration setting; and
   in response to the determination, changing the second configuration parameter setting to the different setting.

2. The method of claim 1, wherein identifying a first configuration parameter setting that is outside of a range of acceptable configuration parameter settings comprises:
   performing, by the one or more data processing devices, Internet Protocol television (IPTV) diagnostic procedures across a plurality of devices within the detected network topology; and
   determining that an IPTV configuration parameter setting of the first device of the plurality of devices does not match a range of acceptable IPTV configuration parameter settings corresponding to the network topology.

3. The method of claim 2, wherein the IPTV configuration parameter setting comprises an Internet Group Management Protocol (IGMP) configuration parameter setting.

4. The method of claim 2, wherein determining that an IPTV configuration parameter setting of the first device of the plurality of devices does not match a range of acceptable IPTV configuration parameter settings corresponding to the network topology comprises determining a priority or a queue configuration parameter setting of the first device in the network topology is inconsistent with a corresponding priority or queue configuration parameter setting of the second device in the data transmission path including the first device and the second device in the network topology.

5. The method of claim 1, wherein changing the second configuration parameter setting to the different setting comprises turnings off Internet Group Management Protocol (IGMP) processing of the third device within the network topology.

6. The method of claim 1, wherein detecting a network topology associated with the one of the plurality of devices based on the network address of the one of the plurality of devices comprises:
   identifying the one of the plurality of devices as a root node;
   recursively discovering the network topology downstream and upstream from the root node until the network topology of the entire network that includes the plurality of devices is discovered; and
   storing the network topology in a recursive data structure.

7. A device, comprising:
   a memory storing instructions executable by one or more processors;
   one or more data processing devices configured to interact with the memory and execute the instructions that cause the device to be configured to:
      receive a network address of one of a plurality of devices in a network;
      detect a network topology associated with the one of the plurality of devices based on the network address of the one of the plurality of devices;
      after detecting the network topology, graph traverse the network topology to obtain configuration parameter settings of the plurality of devices in the network topology;
      identifying, based on the traversing, a first configuration parameter setting of a first device in the network topology that is outside of a range of acceptable configuration parameter settings for the network topology, including identifying the first configuration parameter setting of the first device in the network topology that is inconsistent with a corresponding configuration parameter of a second device in a data transmission path of the network topology that includes the first device and the second device;

provide output specifying the first configuration parameter setting that is outside of the range of acceptable configuration parameter settings for the network topology;

change the first configuration parameter setting to be within the range of acceptable configuration parameter settings for the network topology;

after changing the first configuration parameter setting, determine that changing a second configuration parameter setting of the first device or another device in the network topology to a different setting will improve operation of a third device in the network topology, wherein the second configuration parameter setting is within the range of acceptable configuration parameter settings for the network topology prior to changing the second configuration setting; and in response to the determination, change the second configuration parameter setting to the different setting.

8. The device of claim 7, wherein identifying a first configuration parameter setting that is outside of a range of acceptable configuration parameter settings comprises:

performing Internet Protocol television (IPTV) diagnostic procedures across a plurality of devices within the detected network topology; and determining that an IPTV configuration parameter setting of the first device of the plurality of devices does not match a range of acceptable IPTV configuration parameter settings corresponding to the network topology.

9. The device of claim 8, wherein the IPTV configuration parameter setting comprises an Internet Group Management Protocol (IGMP) configuration parameter setting.

10. The device of claim 8, wherein determining that an IPTV configuration parameter setting of the first device of the plurality of devices does not match a range of acceptable IPTV configuration parameter settings corresponding to the network topology comprises determining a priority or a queue configuration parameter setting of the first device in the network topology is inconsistent with a corresponding priority or queue configuration parameter setting of the second device in the data transmission path including the first device and the second device in the network topology.

11. The device of claim 7, wherein changing the second configuration parameter setting to the different setting comprises turnings off Internet Group Management Protocol (IGMP) processing of the third device within the network topology.

12. A system, comprising:

an Internet Protocol television (IPTV) network including a plurality of devices; and one or more data processing devices configured to:
    receive a network address of one of the plurality of devices;
    detect a network topology associated with the one of the plurality of devices based on the network address of the one of the plurality of devices;
    after detecting the network topology, graph traversing the network topology to obtain configuration parameter settings of the plurality of devices in the network topology;
    identify, based on the traversing, a first configuration parameter setting of a first device in the network topology that is outside of a range of acceptable configuration parameter settings for the network topology, including identifying the first configuration parameter setting of the first device in the network topology that is inconsistent with a corresponding configuration parameter of a second device in a data transmission path of the network topology that includes the first device and the second device;
    provide output specifying the first configuration parameter setting that is outside of the range of acceptable configuration parameter settings for the network topology;
    change the first configuration parameter setting to be within the range of acceptable configuration parameter settings for the network topology;
    after changing the first configuration parameter setting, determine that changing a second configuration parameter setting of the first device or another device in the network topology to a different setting will improve operation of a third device in the network topology, wherein the second configuration parameter setting is within the range of acceptable configuration parameter settings for the network topology prior to changing the second configuration setting; and
    in response to the determination, change the second configuration parameter setting to the different setting.

13. The system of claim 12, wherein identifying a first configuration parameter setting that is outside of a range of acceptable configuration parameter settings comprises:

performing IPTV diagnostic procedures across a plurality of devices within the detected network topology; and determining that an IPTV configuration parameter setting of the first device of the plurality of devices does not match a range of acceptable IPTV configuration parameter settings corresponding to the network topology.

14. The system of claim 13, wherein the IPTV configuration parameter setting comprises an Internet Group Management Protocol (IGMP) configuration parameter setting.

15. The system of claim 13, wherein determining that an IPTV configuration parameter setting of the first device of the plurality of devices does not match a range of acceptable IPTV configuration parameter settings corresponding to the network topology comprises determining a priority or a queue configuration parameter setting of the first device in the network topology is inconsistent with a corresponding priority or queue configuration parameter setting of the second device in the data transmission path including the first device and the second device in the network topology.

16. The system of claim 12, wherein changing the second configuration parameter setting to the different setting comprises turnings off Internet Group Management Protocol (IGMP) processing of the third device within the network topology.

* * * * *